(12) United States Patent
Lecourt et al.

(10) Patent No.: US 11,341,137 B1
(45) Date of Patent: May 24, 2022

(54) PROCESSING SEARCH REQUESTS

(71) Applicant: AMADEUS S.A.S., Biot (FR)

(72) Inventors: Guillaume Lecourt, Grasse (FR); Jean-Sebastien Thireau, Grasse (FR); Guillaume Le Grand, Le Cannet (FR); Eric Jean Joseph Martin, Villeneuve Loubet (FR); Blerina Topciu, Antibes (FR)

(73) Assignee: Amadeus S.A.S., Biot (FR)

( * ) Notice: Subject to any disclaimer, the term of this patent is extended or adjusted under 35 U.S.C. 154(b) by 32 days.

(21) Appl. No.: 17/112,124

(22) Filed: Dec. 4, 2020

(51) Int. Cl.
| | |
|---|---|
| *G06F 16/2455* | (2019.01) |
| *G06F 16/2457* | (2019.01) |
| *G06F 16/248* | (2019.01) |
| *G06Q 30/02* | (2012.01) |
| *G06Q 50/04* | (2012.01) |
| *G06Q 50/14* | (2012.01) |

(52) U.S. Cl.
CPC ...... *G06F 16/24552* (2019.01); *G06F 16/248* (2019.01); *G06F 16/24573* (2019.01); *G06Q 30/0283* (2013.01); *G06Q 50/14* (2013.01)

(58) Field of Classification Search
CPC ......... G06F 16/24552; G06F 16/24573; G06F 16/248; G06Q 30/0283; G06Q 50/14
See application file for complete search history.

(56) References Cited

U.S. PATENT DOCUMENTS

| | | | | |
|---|---|---|---|---|
| 6,128,623 A * | 10/2000 | Mattis | ................. | H04L 67/2842 707/999.1 |
| 6,128,627 A * | 10/2000 | Mattis | .................... | G06F 16/221 |
| 6,182,086 B1 * | 1/2001 | Lomet | ................. | G06F 11/1471 |
| 6,490,594 B1 * | 12/2002 | Lomet | ................. | G06F 11/1438 |
| 7,177,984 B1 * | 2/2007 | Hervas | ................. | G06F 12/126 711/E12.071 |

(Continued)

FOREIGN PATENT DOCUMENTS

| | | | |
|---|---|---|---|
| EP | 2911070 B1 | 10/2016 | |
| EP | 2913764 B1 | 12/2017 | |

(Continued)

OTHER PUBLICATIONS

European Patent Office, International Search Report and Written Opinion issued in International Patent Application No. PCT/EP2021/084111 dated Feb. 25, 2022.

*Primary Examiner* — Jorge A Casanova
(74) *Attorney, Agent, or Firm* — Thompson Hine LLP

(57) ABSTRACT

Search requests are processed in a distributed database environment which includes a frontend module, one or more clients, a cache, a live data source, and multiple data records. Each data record includes at least one stable data piece stored in the cache and at least one volatile data piece. The frontend module receives a search request from a client and retrieves from the cache a set of data records. Each stable data piece in the set of data records corresponds to search criteria indicated in the search request. Current volatile data pieces, which correspond to the stable data pieces of the retrieved set of data records, are retrieved by the frontend module from the live data source for the retrieved set of data records. A completed set of data records is generated by combining the stable data pieces and the current volatile data pieces, and returned to the requesting client.

20 Claims, 12 Drawing Sheets

(56) References Cited

U.S. PATENT DOCUMENTS

| | | | |
|---|---|---|---|
| 9,507,718 B2* | 11/2016 | Rash | G06F 12/0862 |
| 9,582,536 B2* | 2/2017 | Legrand | G06F 16/245 |
| 9,600,501 B1 | 3/2017 | Fuller | |
| 10,169,429 B2* | 1/2019 | Bourbonnais | G06F 16/245 |
| 10,657,558 B1* | 5/2020 | Lindsay | G06Q 30/0277 |
| 2003/0200194 A1* | 10/2003 | Arnold | G06F 16/24552 |
| 2009/0204753 A1* | 8/2009 | Bridge, Jr. | G06F 12/123 |
| | | | 711/E12.001 |
| 2012/0284062 A1 | 11/2012 | Aubry et al. | |
| 2012/0330693 A1 | 12/2012 | Ciabrini et al. | |
| 2013/0073586 A1 | 3/2013 | Aubry et al. | |
| 2013/0290324 A1 | 10/2013 | Gibergues et al. | |
| 2014/0052750 A1 | 2/2014 | Ciabrini et al. | |
| 2015/0227631 A1 | 8/2015 | Legrand et al. | |
| 2015/0234890 A1 | 8/2015 | Legrand et al. | |
| 2015/0277794 A1* | 10/2015 | Tudor | G06F 3/0619 |
| | | | 711/103 |
| 2016/0171008 A1 | 6/2016 | Ciabrini et al. | |
| 2022/0035755 A1* | 2/2022 | Harper | G06F 13/20 |

FOREIGN PATENT DOCUMENTS

| | | | |
|---|---|---|---|
| EP | 2908255 B1 | 7/2018 | |
| EP | 3128441 B1 | 10/2018 | |
| EP | 2885725 B1 | 12/2018 | |
| EP | 2842085 B1 | 2/2019 | |

* cited by examiner

PROCESSING SEARCH REQUESTS

TECHNICAL FIELD

The present invention relates to processing search requests in a distributed database environment. More specifically, it relates to processing search requests utilizing a cache and a live data source.

BACKGROUND

Increasing the efficiency of the processing of search requests in distributed database and computing environments has already led to a number of approaches and solutions.

One approach to shorten response times to queries is to pre-compute or pre-collect results to search requests and maintain them in a cache. Search requests are then actually not processed on the large volumes of original data stored in data bases, but on the results as maintained in the cache.

Caching, however, has a drawback, namely that the results maintained in the cache may become outdated due to changes in the original data from which the results have been pre-computed or pre-collected. In order to make a cache to fulfil the aforementioned function of shortening response times, measures are taken to keep cached results valid. This is particularly relevant in systems of large data caches in which all or a significant portion of responses are returned based on the cache.

Measures to maintain validity of a cache should be computational-wise efficient, in particular in systems with limited computation resources which are insufficient to re-compute any cached results at all times. For example, re-computing still valid cached results should be avoided for reasons of computational efficiency. Furthermore, continuously re-computing cached results that are outdated at a higher frequency than other cached results might be disadvantageous in terms of employing computation resources efficiently.

SUMMARY

According to a first aspect, a method for processing search requests in a distributed database environment is provided. The distributed database environment comprises a frontend module, one or more clients, a cache, a live data source, multiple data records, wherein each data record comprises at least one stable data piece and at least one volatile data piece, wherein underlying data of at least one stable data piece retrievable from the live data source changes at a first change rate and underlying data of the at least one volatile data piece retrievable from the live data source changes at a second change rate, whereas the second change rate is higher than the first change rate. The cache stores at least the respective at least one stable data pieces of the multiple data records. The method comprises, at the frontend module: receiving a search request from one of the one or more clients; retrieving from the cache, in response to the search request from the one of the one or more clients, a set of data records, wherein the respective at least one stable data pieces of the set of data records correspond to search criteria indicated in the search request; retrieving, from the live data source for the retrieved set of data records, current volatile data pieces, wherein the current volatile data pieces correspond to the stable data pieces of the retrieved set of data records; generating a completed set of data records by respectively combining the stable data pieces of the data records retrieved from the cache and the current volatile data pieces retrieved from the live data source, and returning at least a subset of the completed set of data records to the one of the one or more clients.

In some embodiments, the cache also stores the volatile data pieces of the multiple data records and retrieving the set of data records from the cache comprises checking whether the volatile data pieces of the set of data records correspond to the search criteria indicated in the search request.

In some embodiments, storing the multiple data records in the cache comprises: receiving a number of data records including the multiple data records from at least one external data source; filtering data records of the received number of data records for which the stable data pieces and/or volatile data pieces do not meet given threshold values, and storing remaining unfiltered data records as the multiple data records in the cache.

In some embodiments, the distributed database environment further comprises a master live subsystem and the method further comprises: determining, at the frontend module, that the number of the data records retrieved from the cache is below a predetermined threshold. The method further comprises retrieving, at the frontend module, from the master live subsystem, a set of completed additional data records, wherein the respective at least one additional stable data pieces of the set of completed additional data records correspond to the search criteria indicated in the search request. The retrieving comprises, at the master live subsystem: determining one or more additional stable data pieces corresponding to the search criteria indicated in the search request; calculating respective one or more current additional volatile data pieces corresponding to the determined one or more additional stable data pieces; combining the determined one or more additional stable data pieces with the respective calculated one or more additional volatile data pieces to form the completed additional data records; returning the completed additional data records to the frontend module. The method further comprises adding, at the frontend module, the set of completed additional data records to the completed set of data records.

In some embodiments, the cache stores a subset of at least the respective at least one additional stable data pieces of the completed additional data records.

In some embodiments, in response to generating the completed set of data records, the frontend module selects the subset of the completed set of data records based on given criteria. Furthermore, in response to returning the subset of the completed set of data records to the one of the one or more clients, the frontend module stores the subset in the cache.

In some embodiments, retrieving the current volatile data pieces from the live data source comprises incrementally retrieving the current volatile data pieces from the live data source. The incrementally retrieving comprises, at the frontend module: in a first iteration, retrieving a given first number of the volatile data pieces from the live data source in parallel; in a second iteration, after the first iteration is completed, retrieving a given second number of the volatile data pieces from the live data source in parallel, wherein the second number of the volatile data pieces is greater than the first number of the volatile data pieces.

In some embodiments, generating a completed set of data records by respectively combining the stable data pieces of the data records retrieved from the cache and the current volatile data pieces retrieved from the live data source and returning the completed set of data records to the one of the one or more clients comprise: in response to completing the first iteration of retrieving the given first number of the volatile data pieces, generating a completed first subset of data records by combining the first number of current volatile data pieces with the corresponding stable data pieces of the data records retrieved from the cache and returning the completed first subset of data records to the client; in response to completing the second iteration of retrieving the given second number of the volatile data pieces, generating a completed second subset of data records by combining the second number of current volatile data pieces with the corresponding stable data pieces of the data records retrieved from the cache and returning the completed second subset of data records to the client.

In some embodiments, the data records comprise data specifying travel offers. At least one stable data piece of the data records comprises data specifying at least one of an origin of a travel offer, a destination of a travel offer and a date and at least one volatile data piece of the data records comprises data specifying at least a price of the travel offer. In some embodiments, the volatile data piece of the data records comprises further data specifying a booking class of the travel offer. In some embodiment, the selection of the subset is based on a score value representing the price. In some embodiment, the selection of the subset is based on a score value representing at least a further data piece of the data record.

According to another aspect, a computing machine is provided, the computing machine acting as a frontend module for processing search requests in a distributed database environment comprising a frontend module, a client, a cache and a live data source, wherein the distributed database environment stores multiple data records, wherein each data record comprises at least one stable data piece and at least one volatile data piece, wherein underlying data of at least one stable data piece retrievable from the live data source changes at a first change rate and underlying data of the at least one volatile data piece retrievable from the live data source changes at a second change rate, whereas the second change rate is higher than the first change rate, wherein the cache stores at least the respective at least one stable data pieces of the multiple data records, the computing machine being arranged to execute the method of any one of the aforementioned aspects and embodiments.

According to still another aspect, a computer program is provided, the computer program product comprising program code instructions stored on a computer readable medium to execute the method steps according to any one of the aforementioned aspects and embodiments when said program is executed on a computer.

The above summary may present a simplified overview of some embodiments of the invention in order to provide a basic understanding of certain aspects of the invention discussed herein. The summary is not intended to provide an extensive overview of the invention, nor is it intended to identify any key or critical elements, or delineate the scope of the invention. The sole purpose of the summary is merely to present some concepts in a simplified form as an introduction to the detailed description presented below.

BRIEF DESCRIPTION OF THE DRAWINGS

The accompanying drawings, which are incorporated in and constitute a part of this specification, illustrate various embodiments of the present invention and, together with the general description of the invention given above, and the detailed description of the embodiments given below, serve to explain the embodiments of the invention. In the drawings, like reference numerals are used to indicate like parts in the various views.

DETAILED DESCRIPTION

Figure 1:
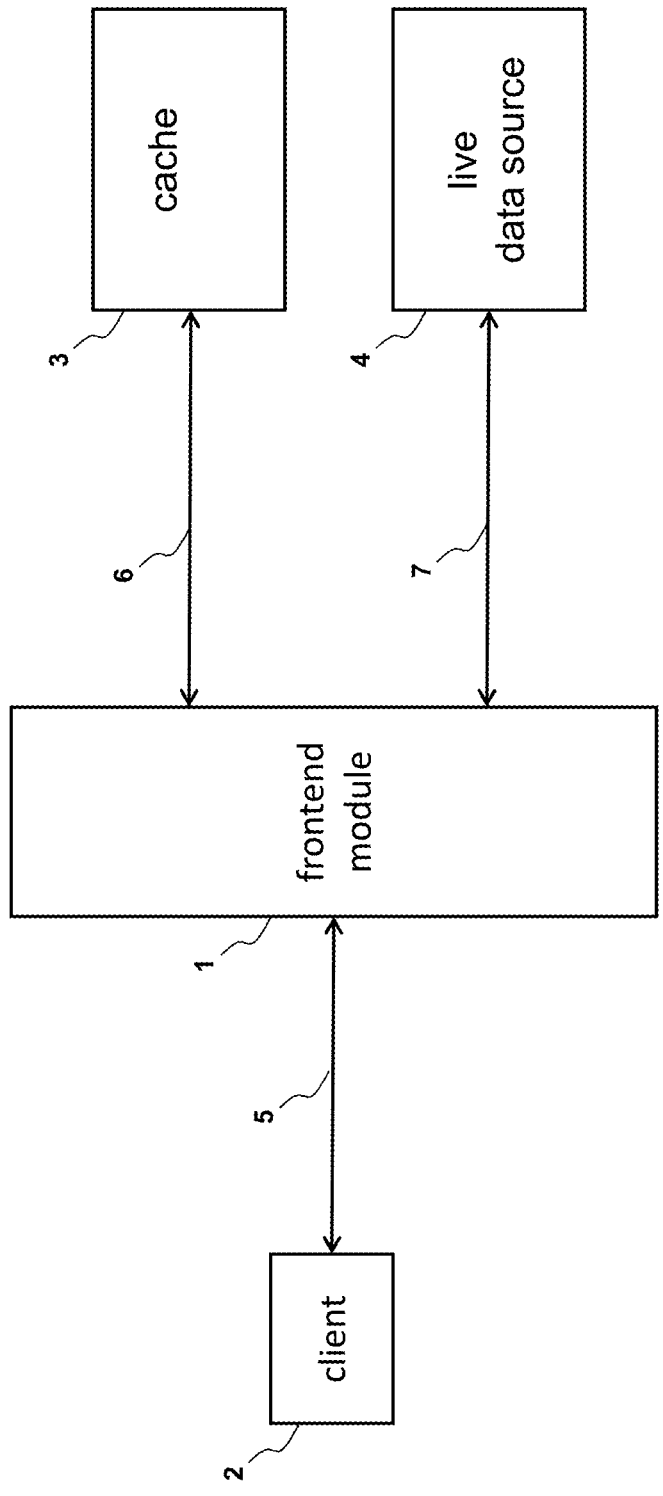
FIG. 1 is schematic depiction of a distributed computer environment as described herein.

The subject disclosure generally pertains to handling search requests in a database system. The term "search request" includes all types of database requests, in particular read requests. The mechanisms described herein may also be employed for all types of requests such as write requests.

Cached data records (search results) can become stale once the underlying data, which may be stored e.g. in a database such as a live data source of a data provider, has changed. The change of the underlying data can occur at certain change rates, whereby different portions of the underlying data can change at different change rates, such as faster and slower change rates. Therefore, in order to maintain a valid cache, the general requirement exists to update the cached data records on a regular time scale, depending on the updates occurring in the underlying data. Updating the cached data can be done by e.g. recomputing the cached data using the corresponding underlying data in the data bases.

Against this background, traditional approaches of cache re-computation mechanisms (such as the prior art documents mentioned above) consider horizontal invalidity rates in the sense that different cached data records (lines of database tables) are outdated at different rates, and therefore discuss measures to efficiently employ re-computation resources at the level of horizontal data records.

In contrast to this, the present methodologies have realized that different invalidity rates may also exist vertically, i.e., different columns of a database table or different fields of cached database records may have different invalidity rates. This is, for example, the case when the cached data comprises composite data records, which are composed of different data pieces taken or computed from different underlying data changing on different change rates. An example for such composite data is a SQL-processable table, with columns in which the data of a first group of columns have to be updated at a slower rate than the data of a second group of columns. The data of the first group of columns may be referred to as stable data pieces and the data of the second group of columns may be referred to as volatile data pieces. A data table as e.g. a SQL-processable table, which may be denoted as "table", may be divided logically along these two group of columns, i. e. vertically, resulting in a stable table part, denoted as "table_stable", and in which the data stored in its columns is outdated at a slower change rate, e.g. in the order of days or weeks. The division also results in a volatile table part, denoted as "table_volatile", and in which the data stored in the columns is outdated at a faster change rate, e.g. in the order of minutes or hours.

According to embodiments of the subject disclosure, the stable table part "table_stable" is cached, due to its lower invalidity rate and the data pieces of the volatile table part "table_stable" are not (or not necessarily) cached, but are retrieved or computed from an original data source at request time, in order to form combined data pieces.

This mechanism reduces the computational effort to keep the cache valid, since the data stored in the cache includes stable data pieces which become invalidated on a slower change rate and which consequently have to be updated on a slower update rate than volatile data pieces. On the contrary, when the stable data was cached together with its corresponding volatile data as composite cached data records, the stable data would traditionally be recomputed as well when the underlying data of the volatile data has changed, even in the case when the underlying data of the stable data have not been changed and therefore no need exists to recompute the stable data pieces. In addition, this mechanism facilitates that a request for data, such as a search request, is responded with updated and therefore valid data.

A distributed environment for handling search requests according to the subject disclosure is shown in FIG. 1.

Figure 2:
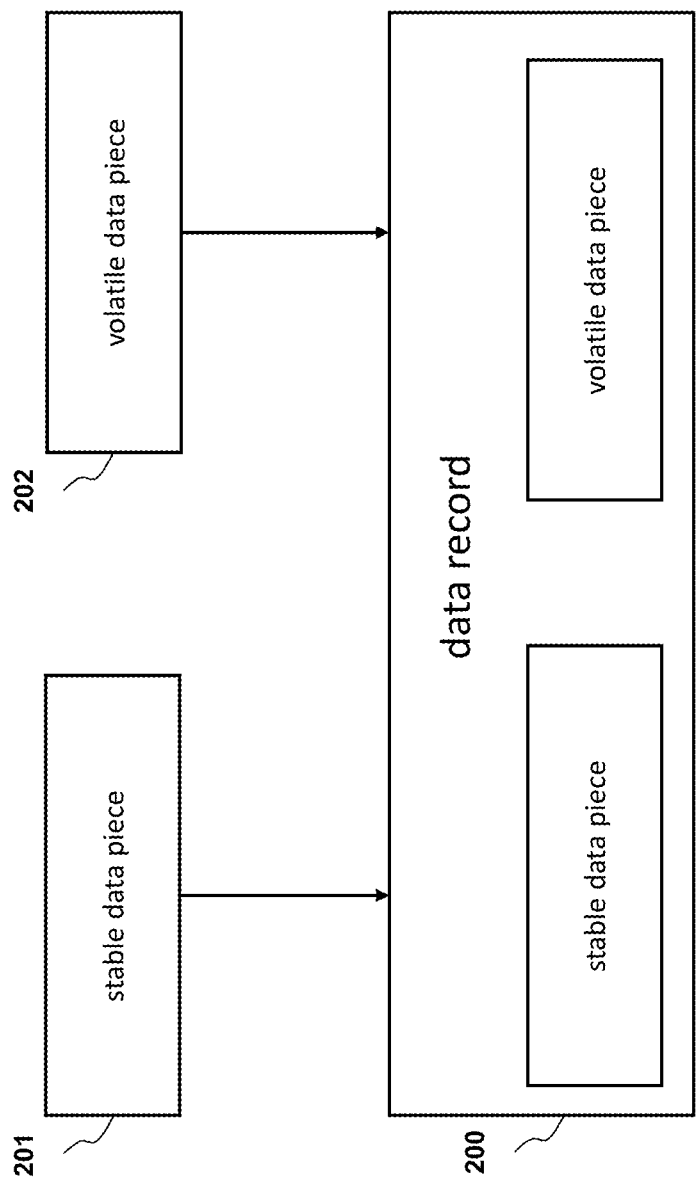
FIG. 2 is a schematic representation of a completed set of data records according to some embodiments.
Figure 3:
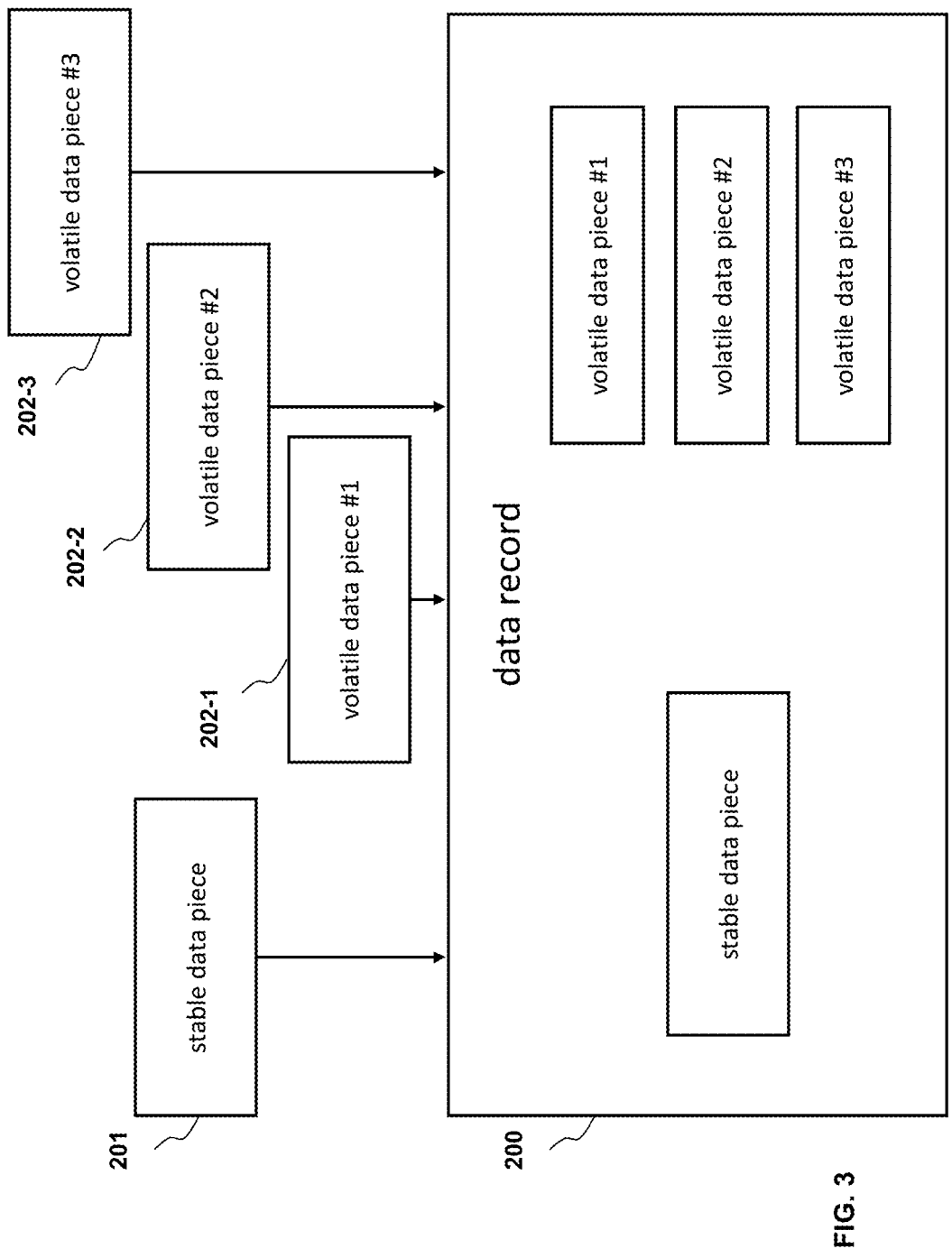
FIG. 3 is a further schematic representation of a completed set of data records according to some embodiments.

The distributed computing environment comprises a frontend module 1, one or more clients 2, a cache 3 and a live data source 4. Within the distributed computing environment multiple data records 200 are stored. Each data record 200, such as a line of an SQL-processable table "table", comprises at least one stable data piece 201, such as an SQL-processable table "table_stable" and at least one volatile data piece 202, such as a line of an SQL-processable table "table_volatile", as shown in FIG. 2 and FIG. 3. Note that the data records 200 may also be held in non-relational and/or NoSQL databases. As mentioned above, underlying data of at least one stable data piece 201 retrievable from the live data source 4 changes at a first change rate and underlying data of the at least one volatile data piece 202 retrievable from the live data source 4 changes at a second change rate. The second change rate is e.g. higher than the first change rate. Cache 3 stores at least the respective at least one stable data piece 201 of the multiple data records 200.

As shown in FIG. 3, in some embodiments, data record 200 may be generated by combining more than one volatile data pieces, such as volatile data piece #1 202-1, volatile data piece #2 202-2 and volatile data piece #3 202-3 with stable data piece 201. In some embodiments, data record 200 may be generated by combining a volatile data piece with more than one stable data pieces.

Frontend system 1, the one or more clients 2, cache 3 and live data source 4 are located anywhere and are individual computing machines such as personal computers, mobile stations such as laptops or tablet computers, smartphones, and the like, as well, in some embodiments, more powerful machines such as database application servers, distributed database systems respectively comprising multiple interconnected machines, data centers etc. In some embodiments, frontend system 1, cache 3 and live data source 4 might be similar machines as the one or more clients 2, while, in other embodiments, frontend system 1, cache 3 and the database 4 are more powerful than the one or more clients 2. In one embodiment, frontend system 1, the one or more clients 2, cache 3 and live data source 4 are data centers which may be worldwide distributed.

Figure 11:
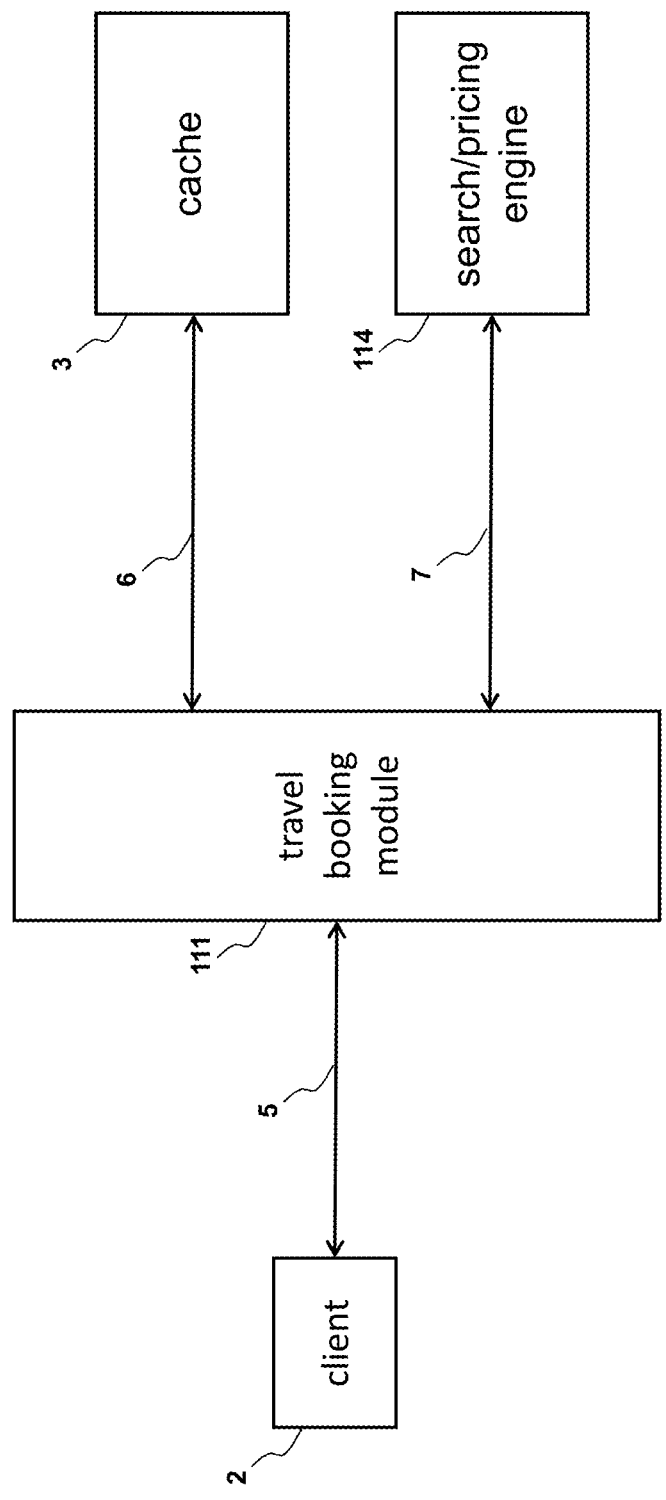
FIG. 11 is a of a distributed computer environment as described herein used for requesting travel offers.

Frontend system 1, cache 3, live data source 4 and the one or more clients 2 may be constituted of several hardware machines depending on performance requirements. Frontend system 1, cache 3, live data source 4 and the one or more clients 2 are embodied e.g., as stationary or mobile hardware machines comprising computing machines 100 as illustrated in FIG. 11 and/or as specialized systems such as embedded systems arranged for a particular technical purpose, and/or as software components running on a general or specialized computing hardware machine (such as a web server and web clients).

Frontend system 1, cache 3, live data source 4 and the one or more clients 2 are interconnected by the communication interfaces 5, 6 and 7. Each of the interfaces 5, 6 and 7 utilizes a wired or wireless Local Area Network (LAN) or a wireline or wireless Metropolitan Area Network (MAN) or a wireline or wireless Wide Area Network (WAN) such as the Internet or a combination of the aforementioned network technologies and are implemented by any suitable communication and network protocols.

Stable data pieces 201 may comprise stable data X1 (e.g. stored in one of the lines of "table_stable") and volatile data pieces may comprise volatile data Y1 (e.g. stored in one of the lines of "table_volatile"). Volatile data Y1 may be associated to stable data X1 by way of keys. Data X1 changes (together with "table_stable") at a rate which is lower than the rate at which data Y1 (together with "table_volatile") change. Data records 200 can be generated by combining one line of table "table_stable", representing e.g. stable data piece 201, with one line of "table_volatile", representing e.g. volatile data piece 202, as indicated in FIG. 2. The combination can be performed by using e.g. the SQL-command JOIN. However, a indicated in FIG. 3, a line of "table_stable" may be combined with several lines taken from "table_volatile" or with one or several lines taken from multiple tables containing volatile data pieces, such as data pieces 202-1, 202-2 and 202-3.

Figure 4:
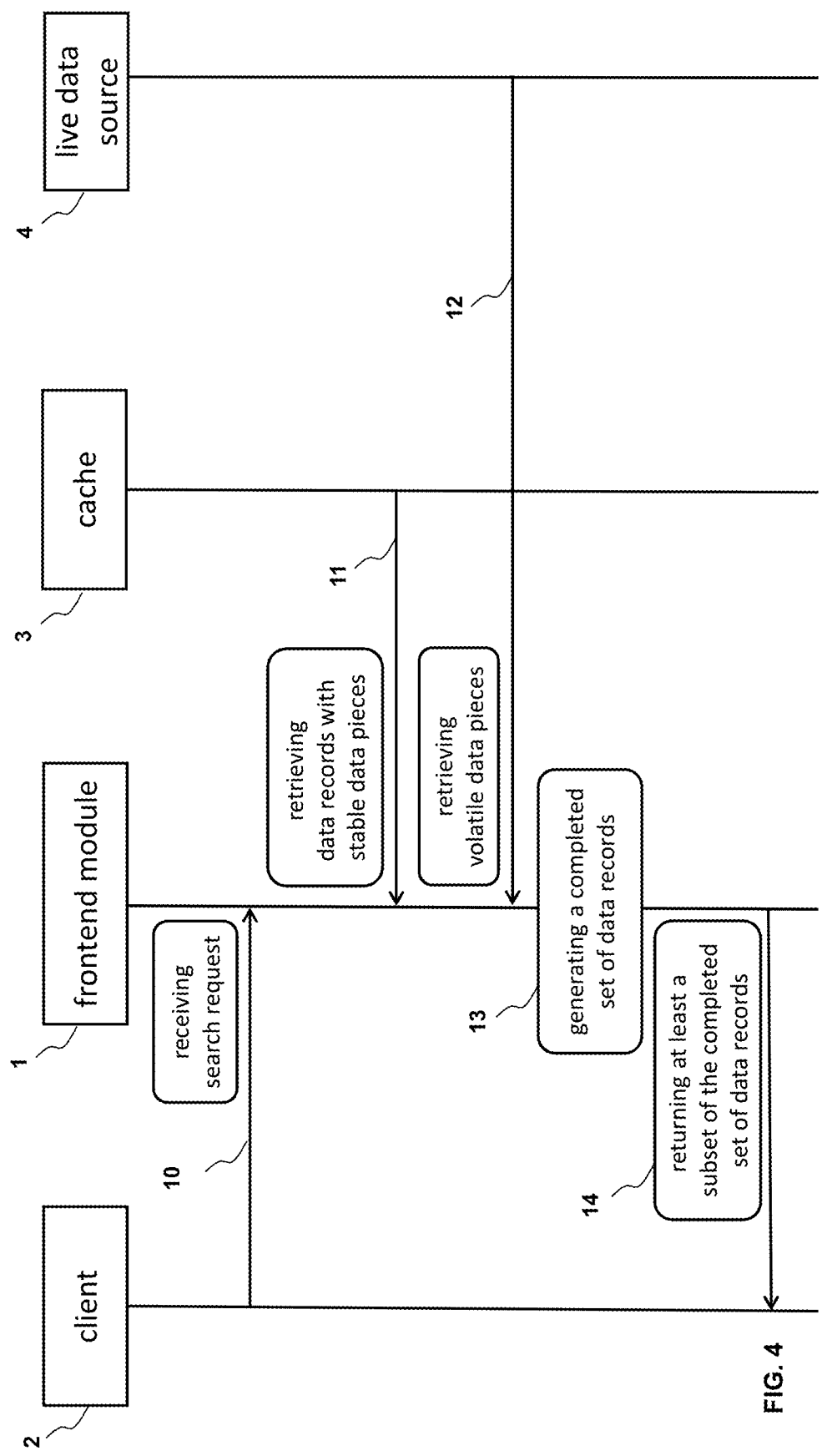
FIG. 4 is a message sequence chart for the retrieval of data records and volatile data pieces in response to a search request according to a first embodiment.

A message sequence chart for a mechanism for handling search requests in a distributed computing environment according to some embodiments is presented in FIG. 4. The mechanism comprises, at the frontend module 1, receiving, in activity 10, a search request from one of the one or more clients 2. In activity 11, in response to the search request from one of the one or more clients 2, the frontend module 1 retrieves from the cache 3, a set of data records 200 with at least the respective at least one stable data pieces. The respective at least one stable data piece 201 of the set of data records 200 correspond to search criteria indicated in the search request. In some embodiments, a number of data records 200 of the retrieved set of data records 200 may be selected, by e.g. a SQL-query, which may select the first N data records from the retrieved set of data records 200. This results in a selection of data records 200, which is based on the search criteria indicated in the search request. In some further embodiments, the selection may be performed after retrieving the stable data pieces of the data records 200 of activity 11 from the cache 3. In activity 12, frontend module 1 retrieves from the live data source 4 for the retrieved set of data records, current volatile data pieces 202 or 202-1, 202-2 and 202-3. The current volatile data pieces 202 or 202-1, 202-2 and 202-3 correspond to the stable data pieces 201 of the retrieved set of data records 200. Frontend module 1 generates, in activity 13, a completed set of data records 200 by respectively combining the stable data pieces 201 of the data records retrieved from the cache and the current volatile data pieces 202 or 202-1, 202-2, and 202-3 retrieved from the live data source, and returns, in activity 14, at least a subset of the completed set of data records 200 to the one of the one or more clients 2. Further details concerning a selection of data records 200 from the completed set of data records 200 to form said subset to be returned to the client 2 are given below.

To cite the aforementioned example relation to SQL-processable tables, the search criteria of the search request may comprise stable data X1, to which the set of data records 200 may correspond to. The search criteria, however, may also comprise criteria relating to volatile data Y1 or Y1 #1, Y1 #2 and Y1 #3, to which the set of data records 200 may additionally correspond.

To further cite the aforementioned example relation to SQL-processable tables, frontend module 1 received in activity 10 from a client 2 a search request indicating stable data X1 as search criteria. Stable data X1 may be stored in one or more stable data pieces in one of the lines of table "table_stable". In response to the search request, frontend module 1 retrieves from cache 3 in activity 11 from table "table_stable" stable data piece 201 comprising stable data X1. In activity 12, frontend module 1 retrieves from live data source 4 volatile data pieces 202 from the updated table "table_volatile" or volatile data pieces 202-1, 202-2 and 202-3 from updated tables "table_volatile #1", "table_volatile #2" and "table_volatile #3". Each of the retrieved volatile data pieces from these tables correspond to the retrieved stable data piece from table "table_stable" e. g. via the correspondence of the volatile data Y1 (stored in volatile data piece 202) or Y1 #1, Y1 #2 and Y1 #3 (stored in volatile data pieces 202-1, 202-2 and 202-3) with stable data X1. In activity 13, frontend module generates a completed set of data records 200 by combining stable data piece 201 from the table "table_stable" with volatile data piece 202 from "table_volatile" or with volatile data pieces 202-1, 202-2 and 202-3 taken from table "table_volatile #1", "table_volatile #2" and "table_volatile #3", using e.g. the SQL-command JOIN. Thus, within the combined set of data records 200, the already existing stable data X1 get combined with freshly computed volatile data Y1 of table "table_volatile" or volatile data Y1 #1, Y1 #2 and Y1 #3 of tables "table_volatile #1", "table_volatile #2" and "table_volatile #3" Frontend module 1 returns in activity 14 at least a subset of the completed set of data records 200, i. e. the respective combinations of the lines of table "table_stable" with table "table_volatile" or tables "table_volatile #1", "table_volatile #2" and "table_volatile #3" to the requesting client 2. Since the data Y1 or Y1 #1, Y1 #2 and Y1 #3 stored in the volatile table represent updated data, client 2 has received valid data in that respect.

Figure 5:
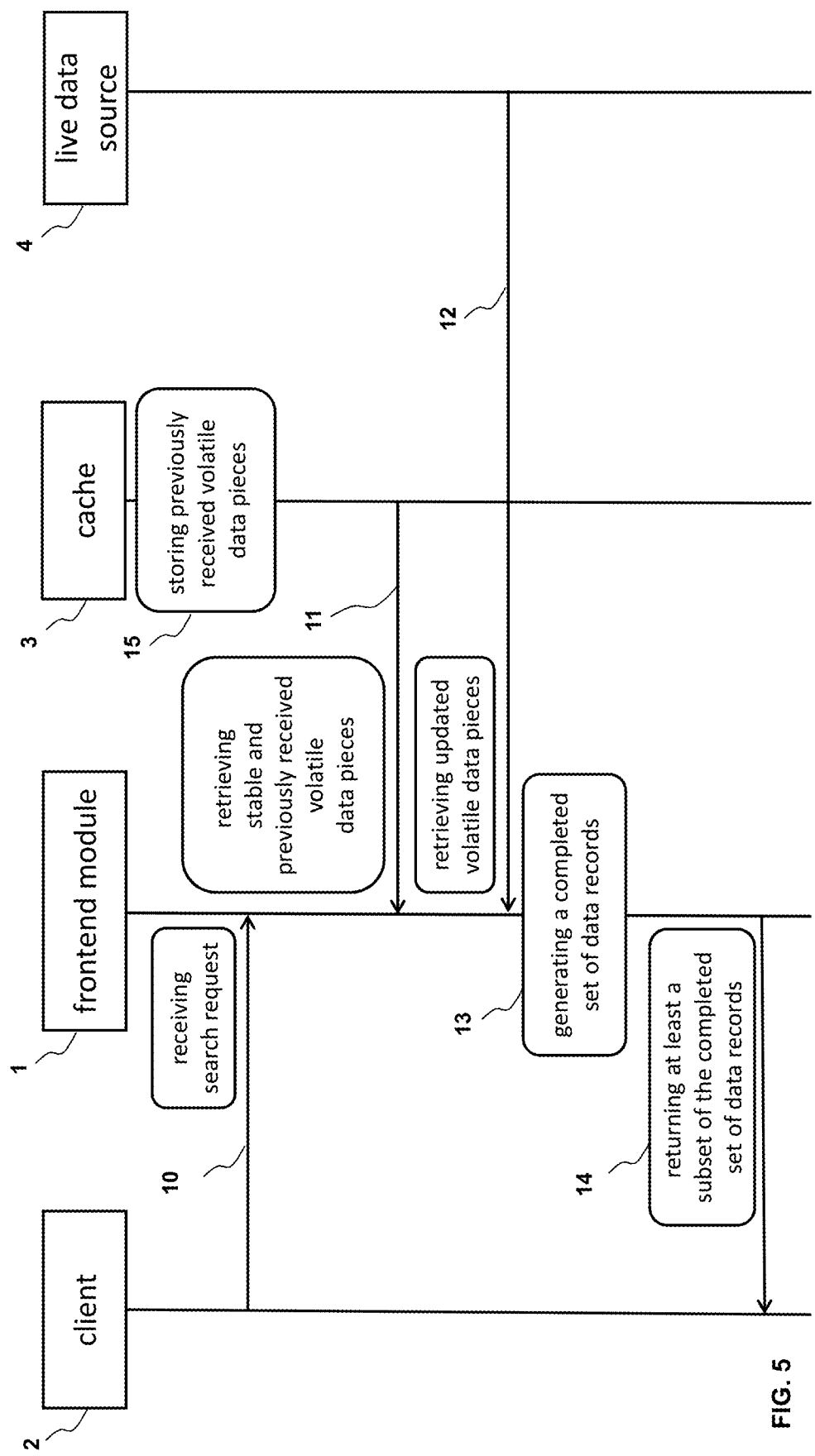
FIG. 5 is a message sequence chart for the retrieval of data records and volatile data pieces in response to a search request according to a second embodiment.

A message sequence chart for a mechanism for processing search requests in a distributed database environment according to further embodiments is presented in FIG. 5. In addition to the mechanism shown in FIG. 4, in the mechanism shown in FIG. 5, the cache 3 also stores, in an activity 15, volatile data pieces 202 or 202-1, 202-2 and 202-3, such as table "table_volatile" or tables "table_volatile #1", "table_volatile #2" and "table_volatile #3" of the multiple data records 200. For example, volatile data pieces 202 or 202-1, 202-2 and 202-3 may be stored in the cache 3 after retrieval 12 from the live data source 4 and kept in the cache 3 for a given period of time, assuming that the probability of the volatile data pieces 202 or 202-1, 202-2 and 202-3 remaining valid during the given time period is relatively high (e.g., above a given validity rate threshold), while the validity probability of the volatile data pieces 202 or 202-1, 202-2 and 202-3 decreases after the given time period (e.g., falls below the given validity rate threshold). In addition or alternatively, in some embodiments, the cache 3 stores a part of the volatile data pieces 202 or 202-1, 202-2 and 202-3 for an indefinite period of time and employs a cache update mechanism to keep the part of the volatile data pieces 202 or 202-1, 202-2 and 202-3 in the cache substantially valid. For example, the cache 3 may store volatile data pieces 202 or 202-1, 202-2 and 202-3 which have a lower invalidity rate compared to other volatile data pieces with a higher invalidity rate and which therefore remain longer valid and thus require less computation resources of the cache update mechanism than updating volatile data pieces with the higher invalidity rate.

Retrieving the set of data records 200 from the cache 3 by the front-end module 1 (activity 11) comprises checking whether the cache includes volatile data pieces 202 or 202-1, 202-2 and 202-3 of the set of data records which correspond to the search criteria indicated in the search request and, if so, retrieving also these volatile data pieces 202 or 202-1, 202-2 and 202-3 from the cache 3. In the alternative or in addition, the frontend module 1 may also retrieve 12 volatile data pieces 202 or 202-1, 202-2 and 202-3 from the live data source 4, for example, if the cache 3 stores a part of the volatile data pieces 202 or 202-1, 202-2 and 202-3 (i.e., some of the columns or fields), while other parts of the volatile data pieces 202 or 202-1, 202-2 and 202-3 remain to be stored in the live data source 4.

Figure 6:
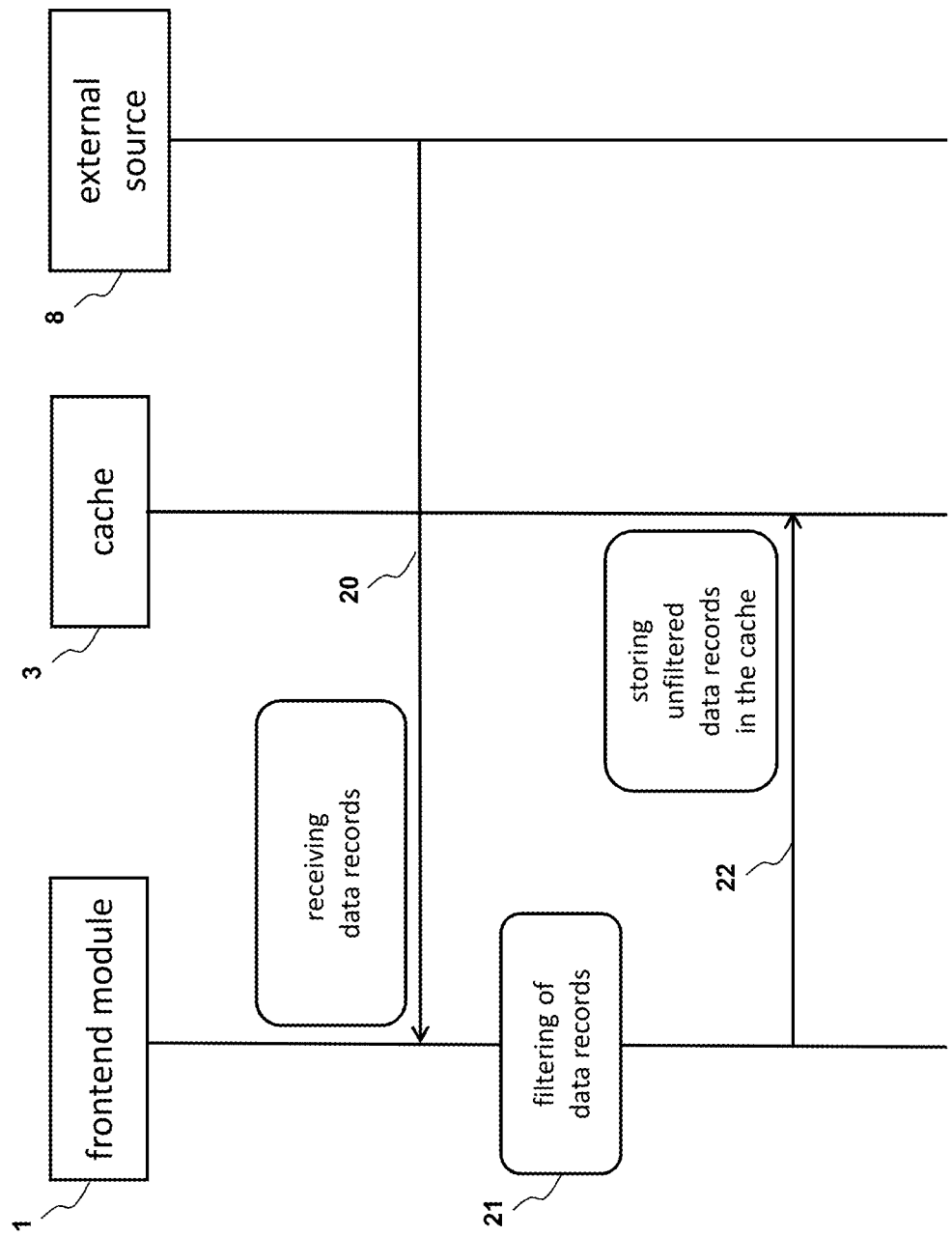
FIG. 6 is a message sequence chart for the receiving of data records from an external source.

In some embodiments, as shown in FIG. 6, storing the multiple data records 200 in the cache 3 comprises receiving, at the frontend module 1, in an activity 20, a number of data records including the multiple data records 200 from at least one external data source 8 and, in activity 21, filtering data records of the received number of data records for which the stable data pieces and/or volatile data pieces do not meet given threshold values. Frontend module 1 stores, in an activity 22, remaining unfiltered data records as the multiple data records 200 in the cache 3.

Choosing again the example of SQL-processable tables, one or more external data sources 8, such as corporate or scientific computing centers or data processing service centers, which may be located at any location in the world, provide SQL-processable tables, which can be accessed by any server or at least a selected group of servers, such as frontend module 1. These external sources provide the data for e.g. updating the data records stored in cache 3. In the activity 20, frontend module 1 may receive from e.g. a corporate data processing center a number of data records 200 which include as data record 200 SQL-processable table "table", which may comprise the stable data piece 201 "table_stable" and the one or more volatile data pieces 202 or 202-1, 202-2 and 202-3, such as tables "table_volatile" or tables "table_volatile #1", "table_volatile #2" and "table_volatile #3". In the activity 21, the received data records 200 is filtered in order to determine which of the overall received data records are actually to be made available to clients 2 served by the frontend module 1. Since the stable data and the volatile data pieces of table "table" meet given filter criteria, table "table" is not filtered by the frontend module 1 in the activity 21, and at least the stable data pieces of the data records 200 of the table "table" are stored, in the activity 22, in cache 3.

Frontend module 1 may, as an example, use filter criteria for filtering received data records 200 in the activity 21. The filter criteria may include aforementioned validity rate thresholds enabling the frontend module to differentiate between stable data pieces and volatile data pieces and thus to decide which data pieces (columns) are to be stored in the cache 3 and which other data pieces are only to retrieved from the live data source 4 (such as the computing centers mentioned above) at request time. The validity rate threshold value, which has to be met by the data records, respectively their stable and volatile data pieces (such as e.g. stable and volatile data pieces 201, 202 or 202-1, 202-2 and 202-3) may be set at 70%. Hence, data pieces having a validity rate of 70% or more are classified as stable data pieces and stored in the cache 3, while other data pieces are classified as volatile data pieces and retrieved from the live data source 4 at request time. The validity rates of the data pieces may be determined by the frontend module 1 in various ways, e.g., based on validity statistics of the data pieces obtained from their invalidity history, or the invalidity rates may also be signalled explicitly by the external source 8 or another entity.

Figure 7:
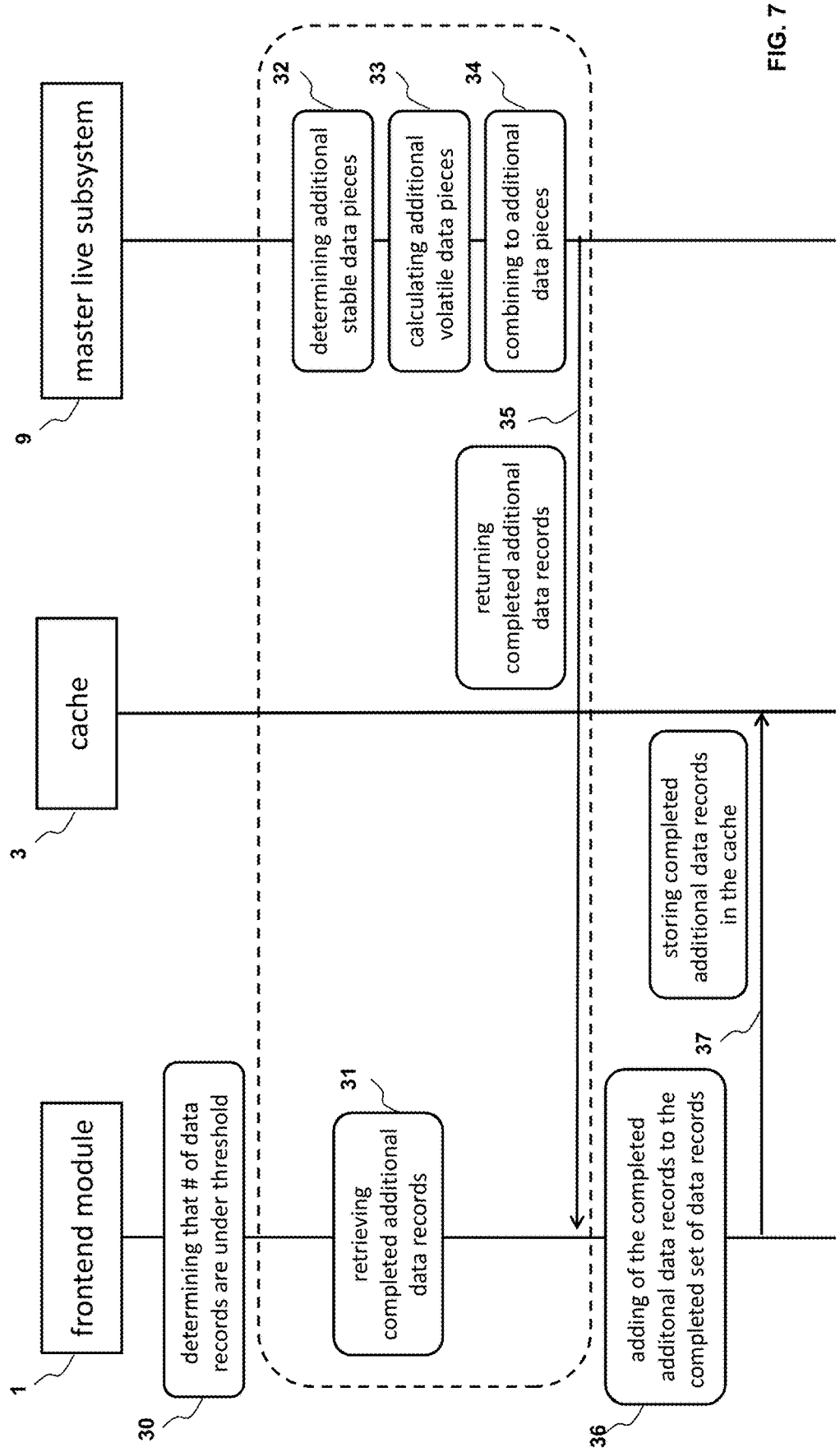
FIG. 7 is a message sequence chart for the retrieving of additional data records according to a first embodiment.

In some embodiments, as shown in FIG. 7, the distributed computing environment further comprises a master live subsystem 9 for retrieval of additional data records that may not be held by the cache 3 and/or the live data source 4, and the mechanism further comprises a determination, at the frontend module 1, in an activity 30, that the number of the data records 200 retrieved from the cache 3 is below a predetermined number threshold. The mechanism further comprises retrieving, in activity 31, at the frontend module 1 from the master live subsystem 9, a set of completed additional data records 200, wherein the respective at least one additional stable data piece 201 of the set of completed additional data records 200 correspond to the search criteria indicated in the search request. The activity 31 comprises, at the master live subsystem 9, a determination (sub-activity 32) of one or more additional stable data pieces 201 corresponding to the search criteria indicated in the search request and the calculation (sub-activity 33) of respective one or more current additional volatile data pieces 202 or 202-1, 202-2 and 202-3 corresponding to the determined one or more additional stable data pieces 201. Within activity 31, the master live subsystem 9 combines, in sub-activity 34, the determined one or more additional stable data pieces with the respective calculated one or more additional volatile data pieces to form the completed additional data records and returns in sub-activity 35 the completed additional data records to the frontend module. The frontend-module 1 adds, in activity 36, the set of completed additional data records 200 to the completed set of data records 200.

Resuming the aforementioned example of SQL-processable tables, the frontend module 1, after having generated for the response to a search request in activity 13 as a complete set of data records 200 a number of SQL-processable tables (which includes the table "table" with the stable data piece 201 "table_stable") may determine, in activity 30, that the number of generated completed tables is below a certain threshold in order to provide a sufficient response to the search request from the client 2. As an example, when the number threshold is set at a value of 2, providing just one data record, such as table "table" as a response to a search request would constitute an insufficient response to the search request. In such situation, frontend module 1 therefore retrieves, in activity 31, from an additional data source herein denoted as master live subsystem 9, additional completed SQL-processable tables, which may comprise table "table_additional", which themselves comprise of stable and volatile data pieces, which correspond to the search criteria indicated in the search request. As an example, search request may again indicate X1 as search criteria. Within activity 31, in sub-activity 32, master live subsystem 9 determines the additional stable data pieces 201, such as SQL-processable table "table_stable_additional", which has stable data X1 stored in its lines. In sub-activity 33 (also within activity 31), master live subsystem 9 calculates the additional volatile data pieces (202 or 202-1, 202-2 and 202-3), which may comprise the SQL-processable table "table_volatile additional" with the volatile data Y1 associated with the stable data X1. In sub-activity 34 (within activity 31), the additional volatile data pieces (202 or 202-1, 202-2 and 202-3) are combined with the set of data records 200 by e.g. a SQL based JOIN-command. Table "table_additional" is formed and in sub-activity 35 (within activity 31) returned to the frontend-module 1. In activity 36, the frontend-module adds table "table_additional" to table "table". The number of generated completed tables now meets the number threshold value of 2 and a sufficient response to the search request from the client 2 can be returned.

Master live subsystem 9, e.g. additional data source 9, may be separated from cache 3 and live data source 4. In some embodiments, however, master live subsystem 9 and live data source 4 may be comprised by another database system such as a computing center as mentioned above. In some embodiments, master live subsystem 9 may provide data such as SQL-processable tables to cache 3 and live data source 4.

In some embodiments, as also shown in FIG. 7, the cache 3 stores, in activity 37, a subset of at least the respective at least one additional stable data pieces of the completed additional data records, such as e.g. table "table_stable_additional" of table "table_additional". Hence, these additional data records may be retrieved directly from the cache 3 (as opposed to the master live subsystem 9) in response to a further search request requesting data records that meet the same search criteria as the presently processed search request. As explained above, storing the completed additional data records in the cache 3 may be done for a given period of time, e.g., dependent on the invalidity rate of the volatile data pieces of the completed additional data records.

Figure 8:
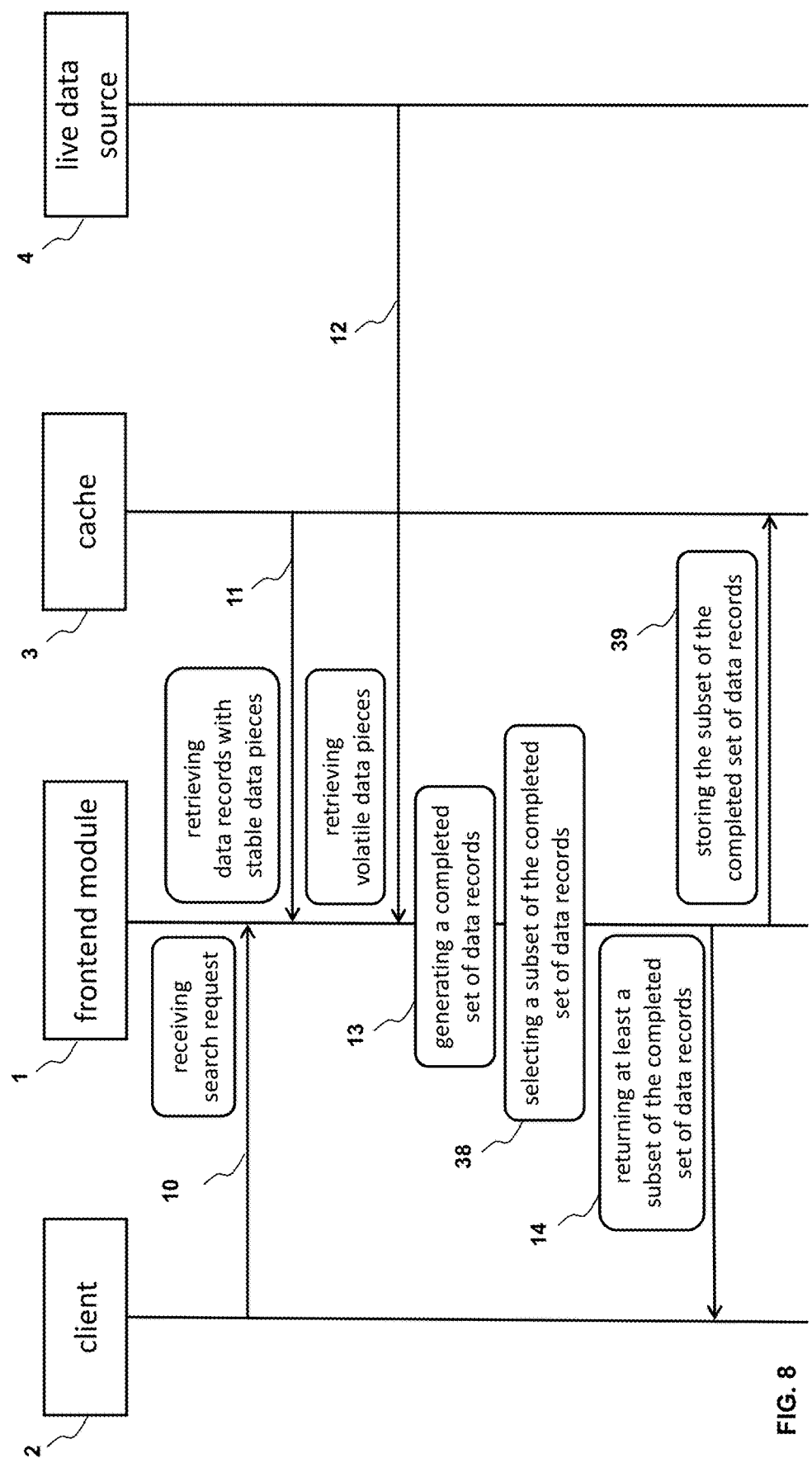
FIG. 8 is a message sequence chart for the retrieving of additional data records according to a second embodiment.

In some embodiments, as shown in FIG. 8, the frontend module 1 selects, in activity 38, in response to generating the completed set of data records 200, the subset of the completed set of data records 200 according to given criteria. In response to returning the subset of the completed set of data records 200 to the one of the one or more clients 2, the frontend-module 1 stores, in activity 39, the subset in the cache 3. The completed set of data records 200 may comprise, as an example, of stable data piece #11/volatile data piece #11, stable data piece #12/volatile data piece #12, stable data piece #13/volatile data piece #13. The subset selected by the frontend module 1 in activity 38, returned to the client 2 in activity 14 and stored in cache 2 (activity 39) may comprise of stable data piece #11/volatile data piece #11 and stable data piece #12/volatile data piece #12. The two data records 200 of the subset may be determined by using metrics indicating to which extent the data records 200 fulfill search parameters indicated in the search request.

For example, the search request may request an indicated number of data records 200 with data pieces specifying certain values, such as two network routes with the highest bandwidth (cf. the exemplary network routing embodiment described below with reference to FIG. 10). The frontend module then selects the two data records 200 representing the network routes with the highest bandwidth characteristics and returns these selected data records to the client, while other data records 200 specifying network routes with lower bandwidth characteristics are not returned.

In some embodiments, a score may be utilized as a given criteria. The score may constitute a normalized representation of multiple data pieces of the data records 200, to render heterogeneous data records 200 (e.g., in terms of different values in different data pieces) comparable and therefore processible in a more efficient manner. To this end, the frontend module 1 may compute weight values for individual data pieces and then calculate an aggregated score for each of the completed data records 200. For example, the frontend module 1 may calculate weight values for the bandwidth data piece and for the current load of network routes represented by the completed data records 200. Higher bandwidth characteristics result in higher weight values than lower bandwidth characteristics, while higher current load characteristics result in lower weight values than lower current load characteristics. An aggregation of these data-piece-individual weight values to obtain the score may be given e.g., by a summation or (weighted) average of the weight values.

The aggregated scores may establish a ranked order of the completed data records 200 and facilitate an efficient selection. Higher aggregated scores may indicate that respective data records constitute a better match to the search parameters indicated in the search request than lower aggregated scores. Hence, such completed data records with higher scores may be returned to the client 2, while data records with lower aggregated scores are filtered/discarded by the frontend server 1. Further details of weight values and scores are set forth in pending European Patent application with the application number EP 20 306 251.8 filed on 21 Oct. 2020.

In some embodiments, the computed scores themselves form an additional data piece of the subset of the completed data records 200. In these embodiments, the frontend module 1 may store the selected subset of the completed data records 200 which was returned to the client 2 including the scores in the cache 3. This facilitates efficient processing of further search results such as follow-up search requests relating to the returned subset of completed data records 200. For example, a further selection from the stored subset of completed data records 200 to form a sub-subset may then be made based on the calculated scores based on the cache 3, without any need to retrieve volatile data pieces from the live data source 4.

Figure 9:
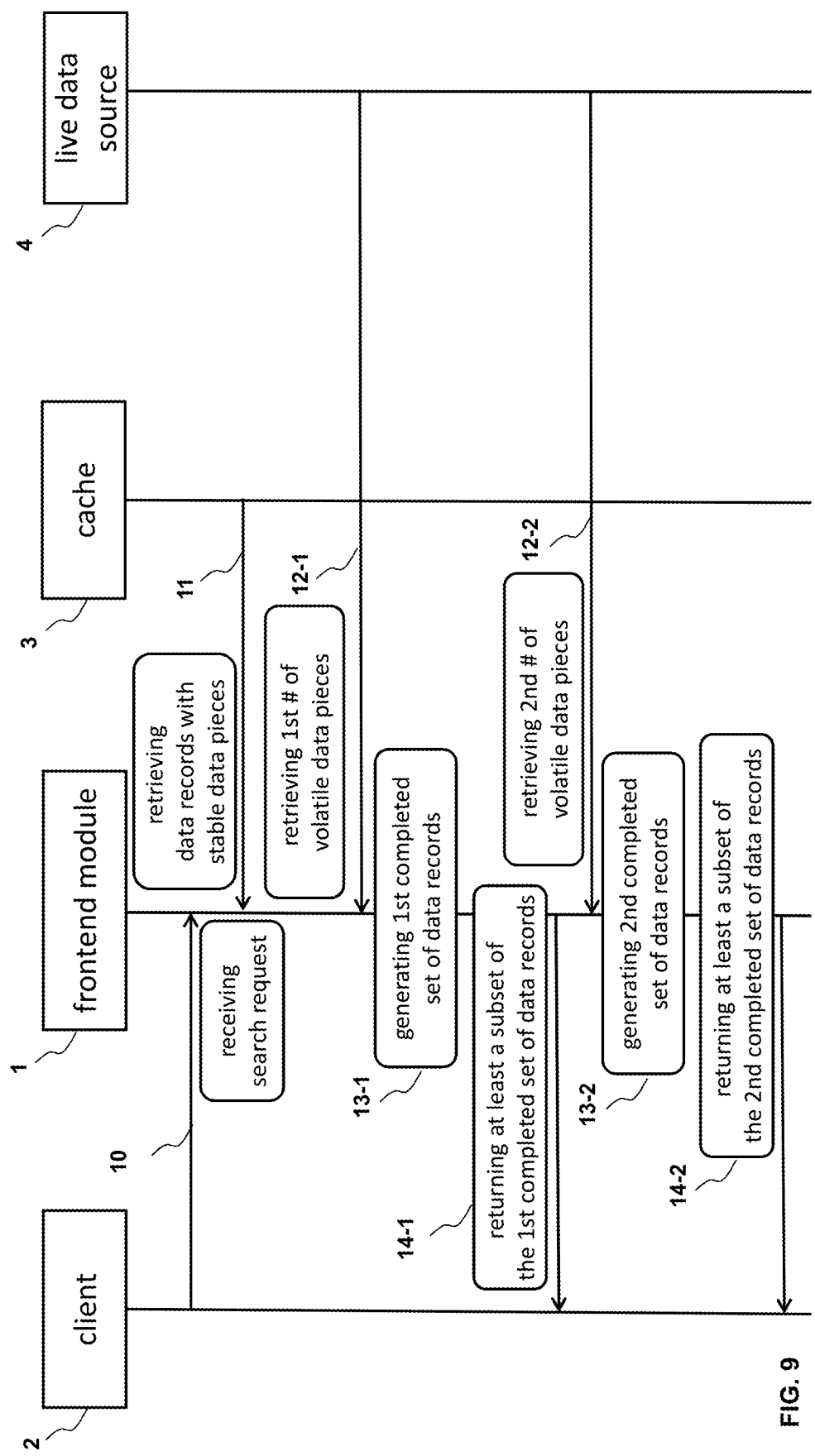
FIG. 9 is a message sequence chart for the retrieving of volatile data pieces in more than one iteration.

In some embodiments, as shown in FIG. 9, retrieving the current volatile data pieces 202 or 202-1, 202-2 and 202-3 from the live data source 4 by the frontend module 1 comprises incrementally retrieving the current volatile data pieces 202 or 202-1, 202-2 and 202-3 from the live data source 4. In a first iteration, the frontend module 1 retrieves in activity 12-1 a given first number of the volatile data pieces from the live data source 4 in parallel. After having received the first number of volatile data pieces, the frontend module 1 generates a first number of completed data records including the retrieved first number of volatile data pieces and the corresponding stable data pieces and returns this first number of completed data records to the client 2. In a second iteration, after the first iteration is completed, frontend-module 1 retrieves in activity 12-2 a given second number of the volatile data pieces from the live data source 4 in parallel, wherein the second number of the volatile data pieces is greater than the first number of the volatile data pieces. The frontend module 1 then generates a second number of completed data records including the second number of volatile data pieces and the corresponding stable data pieces and returned the second number of complete data records to the client 2. Generating a completed set of data records 200 at the frontend-module 1 by respectively combining the stable data pieces 201 of the data records 200 retrieved from the cache 3 and the current volatile data pieces 202 or 202-1, 202-2 and 202-3 retrieved from the live data source 4 and returning the completed set of data records 200 to the one of the one or more clients 2 comprises, at the frontend-module 1, in response to completing the first iteration of retrieving the given first number of the volatile data pieces (activity 12-1), generating, in activity 13-1, a completed first subset of data records 200 by combining the first number of current volatile data pieces with the corresponding stable data pieces 201 of the data records 200 retrieved from the cache 3 and returning in activity 14-1 at least a subset of the completed first subset of data records 200 to the client 2. In response to completing the second iteration of retrieving the given second number of the volatile data pieces (activity 12-2), frontend module 1 generates in activity 13-2 a completed second subset of data records 200 by combining the second number of current volatile data pieces with the corresponding stable data pieces 201 of the data records 200 retrieved from the cache 3 and returning in activity 14-2 at least a subset of the completed second subset of data records 200 to the client 2. This enables a first response to the search request of client 2 immediately after the generation of that subset in activity 13-1 has been completed.

This subdivision into iteratively greater retrieval batches of volatile data pieces facilitates a timely incremental processing of the volatile data pieces 202 at the frontend module 1 and timely incremental return of the completed data pieces to the client 2 even if a significant number of volatile data pieces 202 or 202-1, 202-2 and 202-3 is to be retrieved from the live data source 4. The frontend module 1 is enabled to already process the first number of volatile data pieces while the second number of data pieces (and so on) are still to be retrieved.

Referring again to the example of SQL-processable tables, frontend module may receive in the first iteration (activity 12-1) volatile data piece #1 202-1, i. e. table "table_volatile #1" and in the second iteration (activity 12-2) volatile data piece #2 202-2 and volatile data piece #3, i. e. tables "table_volatile #2" and "table_volatile #3".

Citing again the example of SQL-processable tables, after frontend module 1 has received in the first iteration (activity 12-1) e.g. table "table_volatile #1", frontend module 1 generates, in activity 13-1, the completed first subset of data records 200 by combining, as an example, table "table_volatile #1" with table "table_stable" retrieved from the cache 3, by e.g. using the SQL-command JOIN. Frontend-module 1 then returns in activity 14-1 this first combined table to the client 2. Then, after frontend module 1 has received in the second iteration (activity 12-2) tables "table_volatile #2" and "table_volatile #3", frontend module 1 generates, in activity 13-2, the completed second subset of data records 200 by combining, as an example, tables "table_volatile #2" and "table_volatile #3" with table "table_stable" retrieved from the cache 3, by e.g. again using the SQL-command JOIN. Frontend-module 1 then returns in activity 14-2 this second combined table to the client 2.

In some embodiments, additionally or alternatively, the volatile data pieces 202 or 202-1, 202-2 and 202-3 are computed dynamically by the live data source 4 at the time of the request. The frontend module 1 may, as an illustrative example, request in a first iteration the volatile data pieces 202 or 202-1, 202-2 and 202-3 for five stable data pieces 201. In a second iteration, the frontend module 1 requests in a second iteration the volatile data pieces 202 or 202-1, 202-2 and 202-3 for ten stable data pieces 201. The just mentioned numbers of five and ten for the stable data pieces 201 serve only as an illustrative example. In practice, such numbers may be lower or higher, e.g., in the order of tens, hundreds or thousands, depending on the actual use case.

Figure 10:
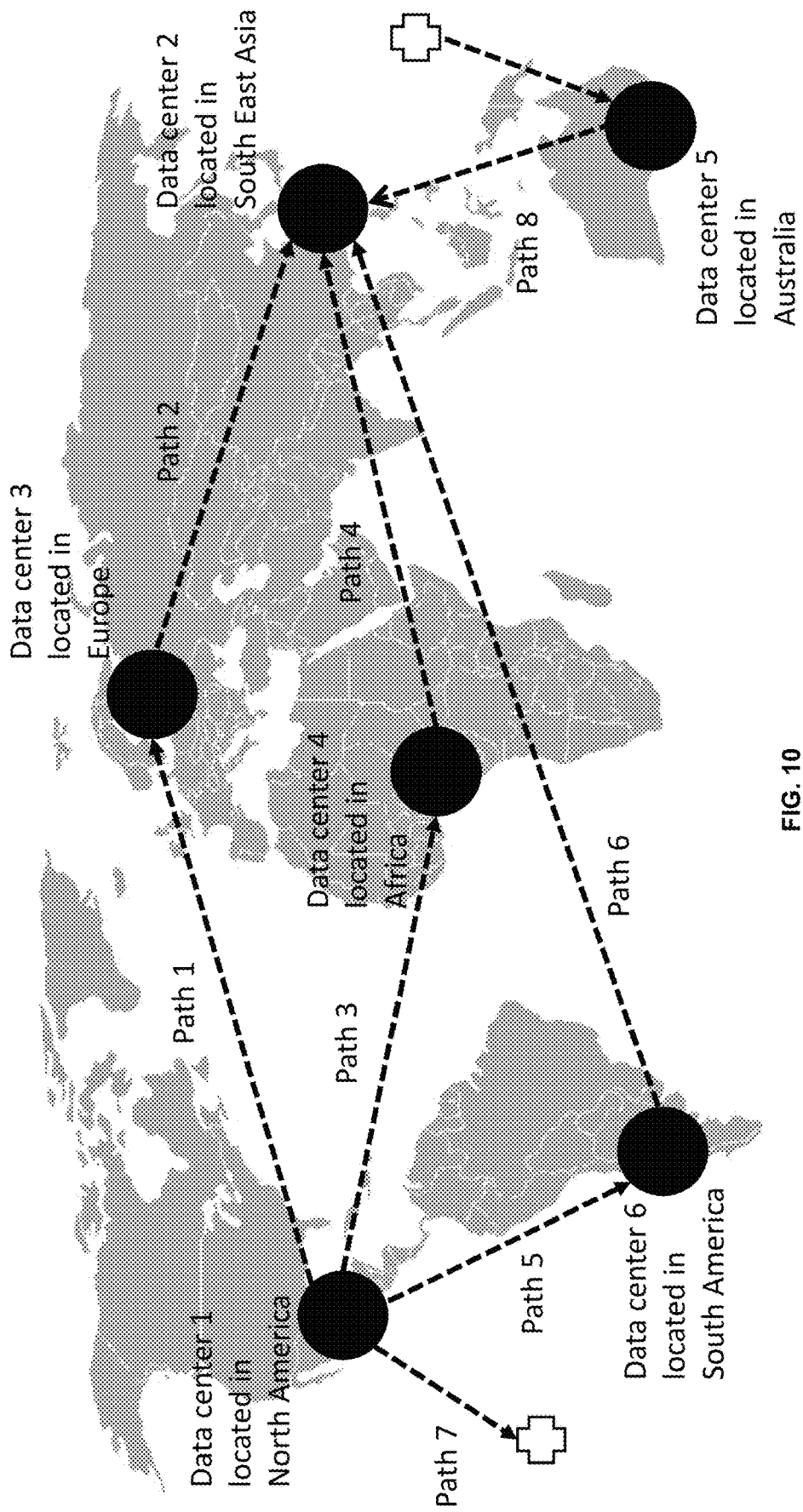
FIG. 10 is a schematic depiction of a worldwide distributed network of data centers, being an exemplar use case for the mechanisms described herein.

An exemplary use case of the mechanisms as described in the subject disclosure relates to network routing between data centers (or generally any type of network nodes) in a communication network as shown in FIG. 10. The network may include data centers distributed worldwide a large number of possible network paths connecting these data centers. Some data specifying the data centers and the network paths, such as data on the location of the data centers or hardware properties of the connecting paths (e.g. optical fibre, electrical cable or satellite) usually remain constant for a longer period of time, such as for a couple of years and can therefore be cached e.g. in the cache of a server as stable data pieces 201 once they have been computed from underlying data stored e. g in a live data source 4 of a service provider for network path data. Some of the cached stable data pieces 201 may be stored in the columns used for stable data pieces of a SQL-processable table, as follows:

| data center # | location | connections (paths) | |
|---|---|---|---|
| data center #1 | North America | path #1 | to data center 3 electric cable |
| | | path #3 | to data center 4 satellite |
| data center #2 | South East Asia | path #2 | to data center 3 fiber cable |
| | | path #6 | to data center 6 satellite |
| | | path #8 | to data center 5 satellite |

Within the cited example, the data centers and the network paths are associated, with additional data such as whether the data centers or the network paths are currently operational, or the current computational or transmission loads of the respective data centers and the paths, as shown in the following tables. This data changes on a much faster change rate, such as in the order of days, hours or even minutes and can be considered as (highly) volatile and therefore as volatile data pieces (202 or 202-1, 202-1 and 202-3), which may be computed from underlying data stored in e.g in the live data source 4 of a service provider for path data. This volatile data may be stored in a SQL-processable table in columns used for volatile data pieces:

| data center | Operational status | computational load |
|---|---|---|
| data center #1 | operational | 50% |
| data center #2 | operational | 95% |
| data center #3 | non operational | 0% |
| data center #4 | operational | 100% |
| path | Operational status | transmission load |
| path #1 | non operational | 0% |
| path #2 | operational | 5% |
| path #3 | operational | 40% |
| path #4 | operational | 90% |

If a client, such as client 2, which may be a computing station of data center #1, is to transmit data to data center #3, client 2 may sent a search request to frontend-module 1 of a server. Frontend-module 1 may retrieve in activities 11 and 12 from the cache 3 the data records with the stable data pieces, i. e. the data on the data centers and the paths and from the live data source 4 the additional volatile data on the data centers and the paths. Using the appropriate SQL commands such as JOIN, frontend-module 1 of the server may generate (activity 13) a table as follows:

| origin | destination | path | oper. status | transm. load | path | oper. status | transm. load |
|---|---|---|---|---|---|---|---|
| data center 1 | data center 2 | path #1 | non op | 0% | path #2 | op | 5% |
| data center 1 | data center 2 | path #3 | op | 40% | path #4 | op | 90% |

Frontend-module 1 finally returns this table to the requesting client 2, the computing station of data center #1, which may select the path combination of path #3 and path #4 to transmit data to data center #2.

One hour later, however, the operational situation of the paths may have changed and client 2 may receive as a response to the same search request the following table.

| origin | destination | path | oper. status | transm. load | path | oper. status | transm. load |
|---|---|---|---|---|---|---|---|
| data center 1 | data center 2 | path #1 | op | 60% | path #2 | op | 70% |
| data center 1 | data center 2 | path #3 | op | 40% | path #4 | op | 90% |

Client 2 may then also select the path combination of path #1 and path #2 to transmit data to data center #2.

A further use case of the present methodologies relates to navigation for assisting vehicle drivers or autonomous vehicles, wherein the stable data pieces 201 specify routes connecting a location A with a location B (stable data). The volatile data pieces 202 or 202-1, 202-1 and 202-3 may comprise additional data related to the routes and drives, such as data on traffic jams, road construction and maintenance work etc. (volatile data), which vary on a timescale in the order of hours and days. Routes connecting locations such as A with B, on the other hand, vary on a much larger time scale, such a months or years. Volatile data pieces 202 or 202-1, 202-1 and 202-3 may also comprise data whether e.g. gas stations and certain shops which are located alongside of the route are currently open. A first combined data record 200 may then read as this: "There is a route connection between location A and B in New York City comprising route Nr. 1111; this route is currently blocked by a traffic jam and gas station XYZ along that route is currently open." A second combined data record 200 may read as follows: "There is a route connection between location A and B in New York City comprising route Nr. 2222; this route is currently open and no gas stations are available at this route." One hour later, the traffic situation in New York City may have changed and a new first combined data record 200 may then read as follows: "There is a route connection between location A and B in New York City comprising route Nr. 1111; this route is currently free and gas station XYZ along that route is currently open.". Three hours later, an updated first data record 200 may read: "There is a route connection between location A and B in New York City comprising route Nr. 1111; this route is currently free jam and gas station XYZ along that route is closed" A combined data record 200 comprising a combination of a stable data record 201 with a number of volatile data records 202-1, 202-2 and 202-3 may read as follows:

There is a route connection between location A and B in New York City comprising route Nr. 1111; this route is currently free and gas station XYZ along that route is currently open."

There is a route connection between location A and B in New York City comprising route Nr. 1111; this route is currently free and gas station ABC along that route is currently closed"

There is a route connection between location A and B in New York City comprising route Nr. 1111; this route is currently free and grocery store EFG along that route is currently open."

Further citing the aforementioned example related to navigation, a driver driving a vehicle in New York City wishes to know a route connecting location A with location B within New York City. While on his/her route, the driver also wishes to refuel the vehicle and to buy some groceries. The driver enters the corresponding parameters of his/her request into a driver assistance system located in the vehicle. A server (=frontend module 1) connected to the driver assistance system receives in activity 10 the request from the driver assistance system (client 2) for a route connection connecting location A with location B within New York City. In activity 11, the server receives as data records 200 from a cache 3, which may be located at a central serving unit, the possible connections between location A and location B, such as the routes Nr. 1111 and 2222, which are comprised by one or more stable data pieces 201. In activity 12, the server retrieves from live data source 4 additional data related to routes Nr. 1111 and 2222, such as the current traffic situation or which stores such as gas stations and grocery stores are currently open and therefore available. In activity 13, the server generates the combined set of data records 200 in the manner as described above and returns, in activity 14 at least a subset of the completed set of data records 200 to the driver assistance system. The driver receives by this way updated data on the possible connections between location A and location B, represented by routes Nr. 1111 and 2222, the traffic situation on these routes and the refuel and shopping possibilities along these routes.

Further developing the example related to navigation, the server can, in an activity 15, store in cache 3 volatile data such as data on a particular traffic situation, e. g on construction or maintenance work occurring over several days on a route between location A and location B. The driver may include in its request for a route between location A and location B also a request for data on ongoing roadworks on these routes. When the server retrieves, in response to the request of the driver, data records 200 comprising volatile data from cache 3, the server checks whether this volatile data, e.g. data on roadworks, is indicated in the criteria of the drivers search request. Since, within the current example, the driver has requested data on ongoing roadworks on the routes between location A and location B, the volatile data retrieved from cache 3 corresponds to the search criteria and will be finally delivered to the driver.

A further use case for the present methodologies relates to the field of travel search, reservation and/or booking. According to FIG. 11, within this use case, the frontend module 1 is comprised by a travel search engine or a reservation engine 111. A client 2, which may represent a customer such as a travel agency, requests data relating to travel, such as flight connections between two cities (Paris to NYC), available hotels, rental cars etc., e.g., in a pre-shopping or shopping scenario in order to obtain a number of priced travel offers (also referred to as travel recommendations) enabling the client to select one of the priced travel offers for booking.

The data records may comprise data specifying travel offers, such as the available flight connections between Paris and New York City on Dec. 31, 2020. In a further example, the data records may also comprise e.g. the available rental cars in New York City or the available hotel rooms in New York City on Dec. 31, 2020. The stable data piece may specify data which is not related to any requesting client, i. e. if two clients request data related to the same travel, the two clients would receive in response to the request the same stable data pieces. The stable data piece of the data records may comprise data specifying flight lists for a certain itinerary comprising at least one of an origin of a travel offer, such as Paris/Charles De Gaulle Airport or Paris/Orly Airport and a destination of a travel offer, such as NYC/Kennedy Airport or NYC/LaGuardia Airport. In addition, some intermediate stops comprised in the itinerary may be specified, such as e.g. a stop in London/Heathrow on the itinerary between Paris and NYC on Dec. 31, 2020. The stable data piece may further comprise the corresponding flight numbers, such as e.g. AF123 for the flight between Paris/Charles de Gaulle and London/Heathrow and AA222 for the flight between London/Heathrow and NYC/Kennedy Airport on Dec. 31, 2020. Furthermore, a date may be specified.

The volatile data piece of the data records comprise data specifying a price of the travel offer, such as a price for a flight connection between Paris and NYC on Dec. 31, 2020. The prices (of the flights) may be determined and stored at the live database 4, which may be comprised by a flight search engine or a pricing engine 114 of FIG. 11. The volatile data pieces may specify data that is related to a certain client, so that one client may receive in response to a request a price for a travel which is different from the price a second client receives in response to a request for the same travel. The variation of the price for a certain travel may also depend on the time the request is made by a client and on the data exchange and distribution systems by which the requested data is received by the clients, such as the Global Distribution System (GDS)-based data exchange or the New Distribution Capability (NDC)-based data change. In addition, the volatile data piece of the data records may comprise the booking class, which may comprise classes such as First Class, Business Class and Economy Class.

The selection of the subset of the available flight connections between Paris and NYC on Dec. 31, 2020, may be based on a score value representing the price. The selection of the subset may further be based on at least a further data piece of the data record, such as the numbers of stops on the route between Paris and NYC. As an example, a partial score for the data piece "number of stops" may be set to 100 for a travel offer offering a flight connection without any stops. If there is one stop (e.g., London/Heathrow), the score may be set to 70. If there are more than one stop, the score maybe set to 0.

The price being a volatile data piece may be computed by the search/pricing engine 114 at search request time, based on data specifying travel offers comprised in the data records, such as the origin and the destination (typically be specified by the search request, i. e. part of the search criteria and thus contributing a database key), the flight number and the date of a flight connection, the number of plane changes, booking classes. The computation may in addition be based on data that are not comprises in the data records, such as fares filed by the airlines, airport fees and taxes etc. The portion of the score value representing the price may be calculated by a given mathematical function, such as non-linear functions. Generally, lower prices result in lower score value portions, while higher prices result in lower score value portions.

The overall score of a travel offer may be given by aggregating the partial scores for the individual data pieces (partial score "number of stops" and partial score "price"; also denoted as weight values further above). For example, both partial scores may be added to obtain an aggregated score value representing both data pieces, the number of stops and the price.

The score may be stored in a data field comprised by the data records, such as the stable data pieces or the volatile data pieces. The score data field may be a data field added to the already existing data fields of the data records and used for the selection of subsets of completed sets of data records that will be retrieved in response to future requests.

The price is computed by the pricing engine 114 at the time of the request by the client 2, so the price of the travel offers is up-to-date at the time of processing the search request. The other stable data such as origin and destination of the travel offers is retrieved from the cache 3 in a computation-resource-efficient manner. The currently computed price is then combined with the stable travel data, which means that the overall results are obtained faster and more efficiently compared to retrieving the complete data records (travel offers) from the live database 4.

Figure 12:
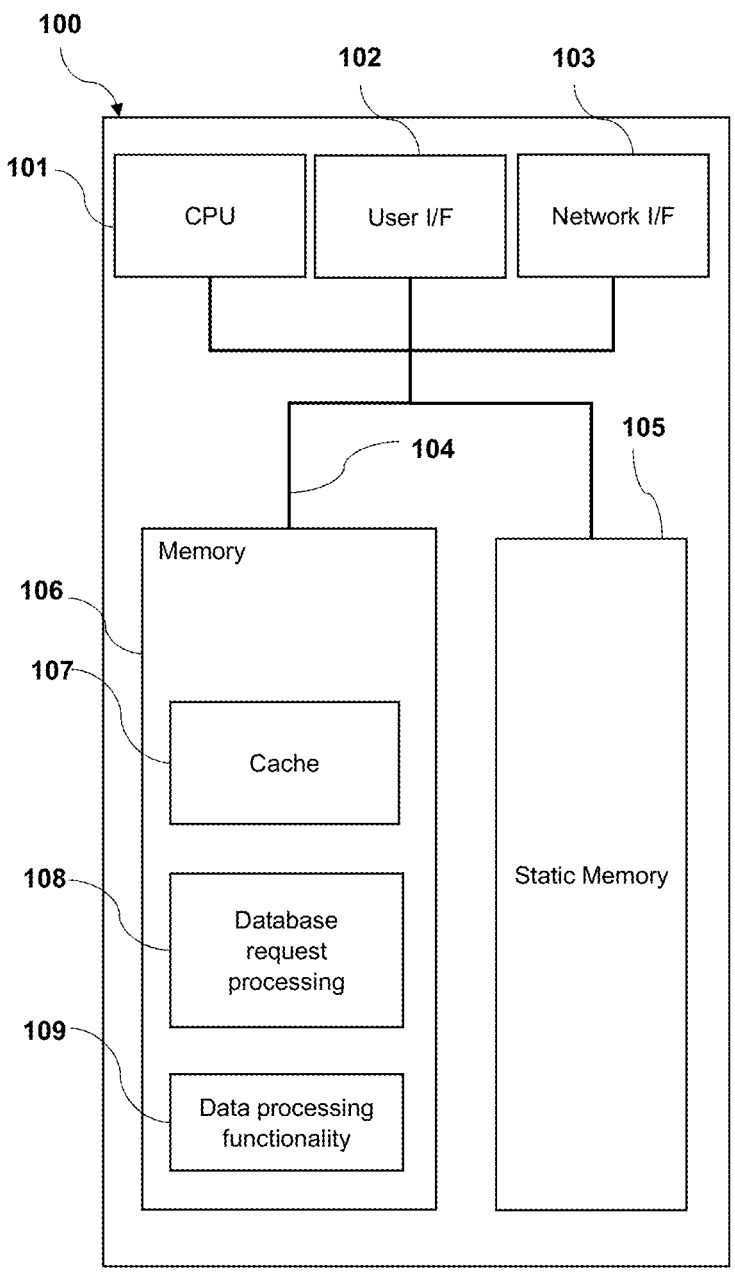
FIG. 12 is a diagrammatic representation of the internal components of a computing machine according to some embodiments.

FIG. 12 is a diagrammatic representation of the internal component of a computing machine of the frontend system 1, the cache 3, the live data base 4 and the one or more clients 2. The computing machine 100 includes a set of instructions to cause the computing machine 100 to perform any of the methodologies discussed herein when executed by the computing machine 100. The computing machine 100 includes at least one processor 101, a main memory 106 and a network interface device 103 which communicate with each other via a bus 104. Optionally, the computing machine 100 may further include a static memory 105 and a disk-drive unit. A video display, an alphanumeric input device and a cursor control device may be provided as examples of user interface 102. The network interface device 103 connects the computing machine 100 to the other components of the distributed database system such as the frontend system 1, the cache 3, the live data base 4 and the one or more clients 2 or further components such as databases.

Computing machine 100 also hosts the cache 107. The cache 107 may store the received data records 200 together with the stable data pieces 201 (and the volatile data pieces 202 or 202-1, 202-2 and 202-3). The cache 107 within the present embodiments may be composed of hardware and software components that store the data records 200 so that future requests for the data records 200 can be served faster than without caching. There can be hardware-based caches such as CPU caches, GPU caches, digital signal processors and translation lookaside buffers, as well as software-based caches such as page caches, web caches (Hypertext Transfer Protocol, HTTP, caches) etc. Frontend module 1, cache 3, live data base 4 and the one or more clients 2 or databases may comprise of a cache 107. Frontend module 1 also performs data processing such as decoding the received data records 200, elimination of errors residing in the data records 200 by removing e, g, redundant data sets from the data records 200 or data sets with missing entries. Furthermore, the data records 200 are brought into a common data format to ease further processing.

A set of computer-executable instructions (i.e., computer program code) embodying any one, or all, of the methodologies described herein, resides completely, or at least partially, in or on a machine-readable medium, e.g., the main memory 106. Main memory 106 hosts computer program code for functional entities such as database request processing 108 which includes the functionality to receive and process database requests and data processing functionality 109. The instructions may further be transmitted or received as a propagated signal via the Internet through the network interface device 103 or via the user interface 102. Communication within computing machine is performed via bus 104. Basic operation of the computing machine 100 is controlled by an operating system which is also located in the main memory 106, the at least one processor 101 and/or the static memory 105.

In general, the routines executed to implement the embodiments of the invention, whether implemented as part of an operating system or a specific application, component, program, object, module or sequence of instructions, or even a subset thereof, may be referred to herein as "computer program code," or simply "program code." Program code typically comprises computer readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer readable program instructions for carrying out operations of the embodiments of the invention may be, for example, assembly language or either source code or object code written in any combination of one or more programming languages.

The program code embodied in any of the applications/modules described herein is capable of being individually or collectively distributed as a program product in a variety of different forms. In particular, the program code may be distributed using a computer readable storage medium having computer readable program instructions thereon for causing a processor to carry out aspects of the embodiments of the invention.

Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include random access memory (RAM), read-only memory (ROM), erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer readable storage medium should not be construed as transitory signals per se (e.g., radio waves or other propagating electromagnetic waves, electromagnetic waves propagating through a transmission media such as a waveguide, or electrical signals transmitted through a wire). Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions/acts specified in the flowcharts, sequence diagrams, and/or block diagrams. The computer program instructions may be provided to one or more processors of a general purpose computer, special purpose computer, or other programmable data processing apparatus to produce a machine, such that the instructions, which execute via the one or more processors, cause a series of computations to be performed to implement the functions and/or acts specified in the flowcharts, sequence diagrams, and/or block diagrams.

In certain alternative embodiments, the functions and/or acts specified in the flowcharts, sequence diagrams, and/or block diagrams may be re-ordered, processed serially, and/or processed concurrently without departing from the scope of the embodiments of the invention. Moreover, any of the flowcharts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. As used herein, the sin-gular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising."

While all of the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A method for processing search requests in a distributed database environment, the distributed database environment comprising a frontend module, one or more clients, a cache, a live data source, and multiple data records, wherein each data record comprises at least one stable data piece and at least one volatile data piece, wherein underlying data of at least one stable data piece retrievable from the live data source changes at a first change rate and underlying data of the at least one volatile data piece retrievable from the live data source changes at a second change rate, whereas the second change rate is higher than the first change rate, wherein the cache stores at least the respective at least one stable data pieces of the multiple data records, and the method comprising, at the frontend module:
receiving a search request from one of the one or more clients;
retrieving from the cache, in response to the search request, a set of data records, wherein the respective at least one stable data pieces of the set of data records correspond to search criteria indicated in the search request;
retrieving, from the live data source for the retrieved set of data records, current volatile data pieces, wherein the current volatile data pieces correspond to the stable data pieces of the retrieved set of data records;
generating a completed set of data records by respectively combining the stable data pieces of the data records retrieved from the cache and the current volatile data pieces retrieved from the live data source; and
returning at least a subset of the completed set of data records to the one of the one or more clients.

2. The method of claim 1, wherein the cache also stores the volatile data pieces of the multiple data records, and retrieving the set of data records from the cache comprises:
checking whether the volatile data pieces of the set of data records correspond to the search criteria indicated in the search request.

3. The method of claim 1 further comprising:
receiving a number of data records including the multiple data records from at least one external data source;
filtering data records of the received number of data records for which the stable data pieces and/or volatile data pieces do not meet given threshold values; and
storing remaining unfiltered data records as the multiple data records in the cache.

4. The method of claim 1, wherein the distributed database environment further comprises a master live subsystem, and further comprising:
determining, at the frontend module, that the number of the data records retrieved from the cache is below a predetermined threshold;
retrieving, at the frontend module, from the master live subsystem, a set of completed additional data records, wherein the respective at least one additional stable data pieces of the set of completed additional data records correspond to the search criteria indicated in the search request, comprising, at the master live subsystem:
determining one or more additional stable data pieces corresponding to the search criteria indicated in the search request,
calculating respective one or more current additional volatile data pieces corresponding to the determined one or more additional stable data pieces, and
combining the determined one or more additional stable data pieces with the respective calculated one or more additional volatile data pieces to form the completed additional data records;
returning the completed additional data records to the frontend module; and
adding, at the frontend module, the set of completed additional data records to the completed set of data records.

5. The method of claim 4, wherein the cache stores a subset of at least the respective at least one additional stable data pieces of the completed additional data records.

6. The method of claim 1 further comprising, at the frontend module:
- in response to generating the completed set of data records, selecting the subset of the completed set of data records based on given criteria; and
- in response to returning at the subset of the completed set of data records to the one of the one or more clients, storing the subset in the cache.

7. The method of claim 6, wherein the data records comprise data specifying travel offers.

8. The method of claim 7, wherein the at least one stable data piece of the data records comprises data specifying an origin of a travel offer, a destination of a travel offer, or a date.

9. The method of claim 8, wherein the at least one volatile data piece of the data records comprises data specifying at least a price of the travel offer.

10. The method of claim 9, wherein the at least one volatile data piece of the data records comprises further data specifying a booking class of the travel offer.

11. The method of claim 10, wherein the selection of the subset is based on a score value representing the price.

12. The method of claim 11, wherein the selection of the subset is based on a score value representing at least a further data piece of the data record.

13. The method of claim 1, wherein retrieving the current volatile data pieces from the live data source comprises incrementally retrieving the current volatile data pieces from the live data source, and incrementally retrieving the current volatile data pieces from the live data source comprises, at the frontend module:
- in a first iteration, retrieving a given first number of the volatile data pieces from the live data source in parallel; and
- in a second iteration, after the first iteration is completed, retrieving a given second number of the volatile data pieces from the live data source in parallel, wherein the second number of the volatile data pieces is greater than the first number of the volatile data pieces.

14. The method of claim 13, wherein generating a completed set of data records by respectively combining the stable data pieces of the data records retrieved from the cache and the current volatile data pieces retrieved from the live data source and returning the completed set of data records to the one of the one or more clients comprise:
- in response to completing the first iteration of retrieving the given first number of the volatile data pieces, generating a completed first subset of data records by combining the first number of current volatile data pieces with the corresponding stable data pieces of the data records retrieved from the cache and returning the completed first subset of data records to the client; and
- in response to completing the second iteration of retrieving the given second number of the volatile data pieces, generating a completed second subset of data records by combining the second number of current volatile data pieces with the corresponding stable data pieces of the data records retrieved from the cache and returning the completed second subset of data records to the client.

15. A computing machine acting as a frontend module for processing search requests in a distributed database environment, the distributed database environment comprising the frontend module, a client, a cache and a live data source, wherein the distributed database environment stores multiple data records, wherein each data record comprises at least one stable data piece and at least one volatile data piece, wherein underlying data of at least one stable data piece retrievable from the live data source changes at a first change rate and underlying data of the at least one volatile data piece retrievable from the live data source changes at a second change rate, whereas the second change rate is higher than the first change rate, wherein the cache stores at least the respective at least one stable data pieces of the multiple data records, the computing machine including at least one processor configured to execute instructions that cause the system to:
- receive a search request from one of the one or more clients;
- retrieve from the cache, in response to the search request, a set of data records, wherein the respective at least one stable data pieces of the set of data records correspond to search criteria indicated in the search request;
- retrieve, from the live data source for the retrieved set of data records, current volatile data pieces, wherein the current volatile data pieces correspond to the stable data pieces of the retrieved set of data records;
- generate a completed set of data records by respectively combining the stable data pieces of the data records retrieved from the cache and the current volatile data pieces retrieved from the live data source; and
- return at least a subset of the completed set of data records to the one of the one or more clients.

16. The computing machine of claim 15, wherein the cache also stores the volatile data pieces of the multiple data records, and the instructions that cause the system to retrieve the set of data records from the cache comprise:
- check whether the volatile data pieces of the set of data records correspond to the search criteria indicated in the search request.

17. The computing machine of claim 15, wherein the instructions further comprise:
- receive a number of data records including the multiple data records from at least one external data source;
- filter data records of the received number of data records for which the stable data pieces and/or volatile data pieces do not meet given threshold values; and
- store remaining unfiltered data records as the multiple data records in the cache.

18. The computing machine of claim 15, further comprising, at the frontend module:
- in response to generating the completed set of data records, selecting the subset of the completed set of data records based on given criteria; and
- in response to returning at the subset of the completed set of data records to the one of the one or more clients, storing the subset in the cache.

19. The computing machine of claim 15, wherein the data records comprise data specifying travel offers, the at least one stable data piece of the data records comprises data specifying an origin of a travel offer, a destination of a travel offer, or a date, and the at least one volatile data piece of the data records comprises data specifying at least a price of the travel offer.

20. A non-transitory computer-readable storage medium comprising instructions that upon execution by a processor of a computing machine cause the computing machine to act as a frontend module for processing search requests in a distributed database environment, the distributed database environment comprising the frontend module, a client, a cache and a live data source, wherein the distributed database environment stores multiple data records, wherein each data record comprises at least one stable data piece and at least one volatile data piece, wherein underlying data of at least one stable data piece retrievable from the live data source changes at a first change rate and underlying data of the at least one volatile data piece retrievable from the live data source changes at a second change rate, whereas the second change rate is higher than the first change rate, wherein the cache stores at least the respective at least one stable data pieces of the multiple data records, the instructions comprising:

receive a search request from one of the one or more clients;

retrieve from the cache, in response to the search request, a set of data records, wherein the respective at least one stable data pieces of the set of data records correspond to search criteria indicated in the search request;

retrieve, from the live data source for the retrieved set of data records, current volatile data pieces, wherein the current volatile data pieces correspond to the stable data pieces of the retrieved set of data records;

generate a completed set of data records by respectively combining the stable data pieces of the data records retrieved from the cache and the current volatile data pieces retrieved from the live data source; and return at least a subset of the completed set of data records to the one of the one or more clients.

\* \* \* \* \*